March 7, 1967  E. BLANK  3,308,358

ELECTRICAL ENERGY STORAGE APPARATUS

Filed Sept. 7, 1965  3 Sheets-Sheet 1

INVENTOR.
EDWARD BLANK
BY
Wolf, Greenfield and Hieken

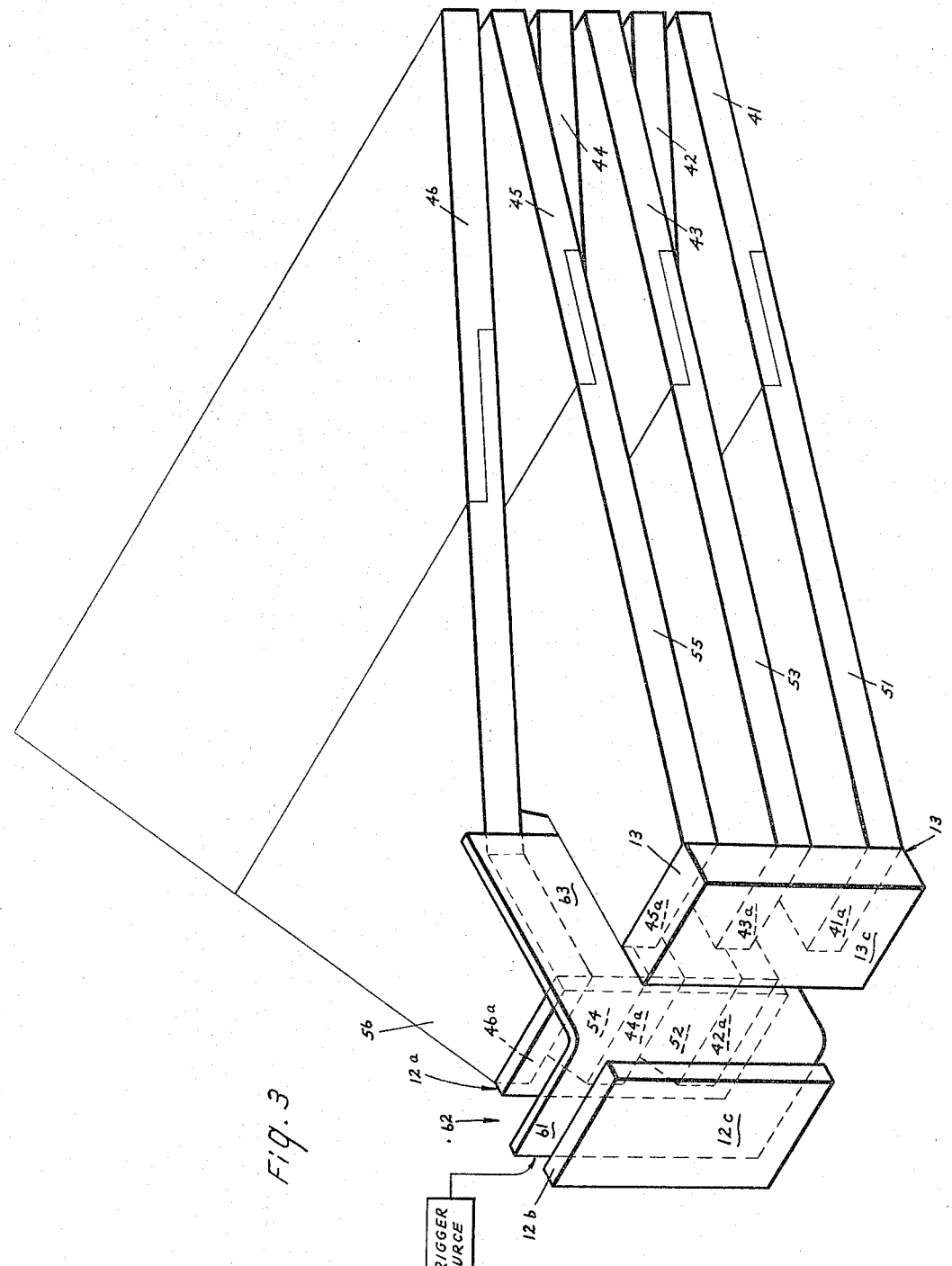

United States Patent Office 3,308,358
Patented Mar. 7, 1967

3,308,358
ELECTRICAL ENERGY STORAGE APPARATUS
Edward Blank, Sharon, Mass., assignor to Tobe Deutschmann Laboratories, Inc., Canton, Mass., a corporation of Massachusetts
Filed Sept. 7, 1965, Ser. No. 485,488
16 Claims. (Cl. 317—256)

The present invention relates in general to electrical apparatus and more particularly concerns electrical energy storage apparatus especially useful for developing intense electrical energy pulses of short duration in a relatively small volume.

It is well known to charge a bank of capacitors in parallel and discharge them through a pair of electrodes to effect a high voltage high energy discharge. Since the stored energy is directly proportional to capacity and the square of voltage, the energy available for discharge may be increased by increasing the effective capacity and/or increasing the voltage. Increasing the voltage presents practical problems related to avoiding dielectric breakdown and problems associated with corona discharge. Increasing the effective capacity is accompanied by a decrease in the effective resonant frequency, a serious problem when it is desired to effect discharge in an exceptionally short time to provide an exceptionally high intensity impulse of short duration.

It is an important object of this invention to provide a source of high electrical energy.

It is another object of this invention to provide a source in accordance with the preceding object capable of supplying an exceptionally high level energy pulse in an exceptionally short time.

It is still a further object of the invention to achieve the preceding objects with a mechanical package that is relatively easy to fabricate and duplicate under production conditions.

It is still a further object of the invention to provide electrical apparatus in accordance with the preceding objects which may also provide a means for receiving the substance to be acted upon by the high electrical energy pulse.

According to the invention, a plurality of capacitors are coupled in parallel to first and second output terminals defining second transmission line means by means including first transmission line means. The first transmission line means comprises at least one first conducting strip and at least one second conducting strip with means for supporting said first and second conducting strips in closely adjacent insulatedly separated relationship. Means maintain the first and second output terminals in closely adjacent opposed insulatedly separated relationship with each having a length corresponding substantially to the height defined by said first transmission line means. Each of the first and second conducting strips are formed with a tapered end portion having a broad end corresponding substantially to a width dimension of said conducting strips tapering to a narrow end immediately adjacent to said first and second output electrodes and corresponding substantially to the distance spanned by said first and second output electrodes in a direction generally parallel to the width dimension of the first and second conducting strips. Thus, the first transmission line means supports propagation of a TEM wave having its electric field vector at right angles to that of the electric field vector in a TEM wave whose propagation is supported by the second transmission line means.

Another feature of the invention resides in having multiple low inductance tab connections from high energy capacitors to the first transmission line means.

Still another feature of the invention is the utilization of an oil filled container to house capacitors, transmission line means and the substance to be acted upon by an intense energy field.

Numerous other features, objects and advantages of the invention will become apparent from the following specification when read in connection with the accompanying drawing in which.

Figure 4:
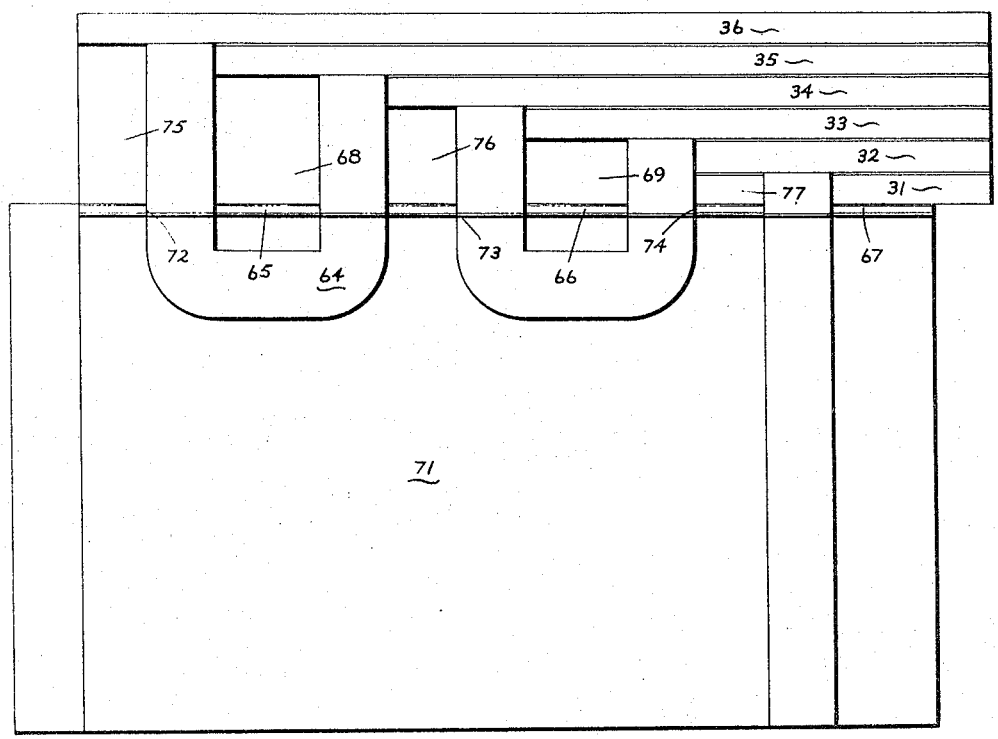

FIG. 3 is a view of the structure immediately adjacent to the output electrodes helpful in understanding the means for guiding energy propagating along parallel paths in first transmission line means formed by opposed plates of high area into a single path at right angles to the parallel paths in second two-plate transmission line means formed by opposed plates of much smaller area; and FIG. 4 illustrates details of how banks of capacitors are coupled to the first transmission line means.

Figure 1:
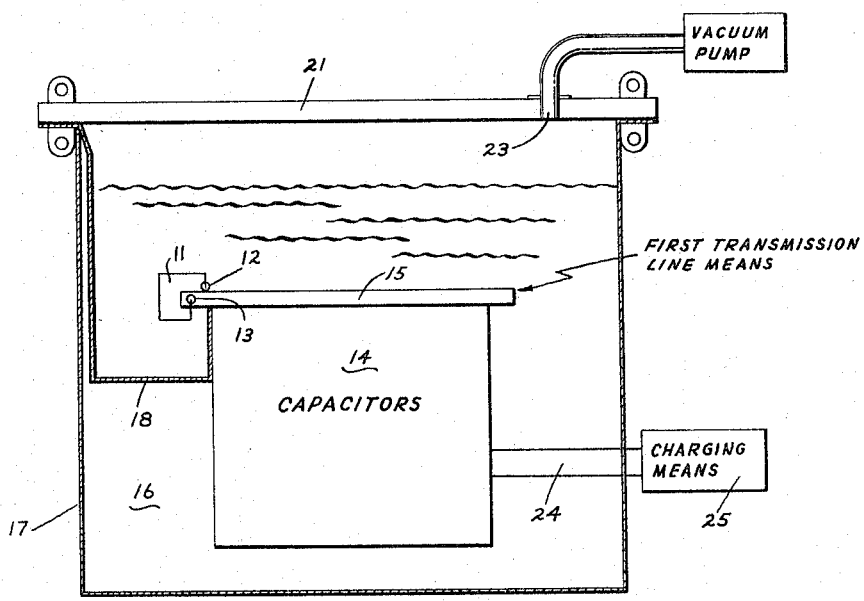
FIG. 1 is a schematic representation of a system according to the invention.

With reference now to the drawing and more particularly FIG. 1 thereof, there is shown a diagrammatic view of a perferred system according to the invention, typically useful in performing high energy experiments where it is desired to obtain an exceptionally high magnetic field, such as that produced when an exceptionally high current flows through a coil of wire, such as 11 in FIG. 1. The coil 11, which may be a single loop of high conductivity wire of exceptionally thick cross section, is connected between a first output terminal 12 and a second output terminal 13. Output terminals 12 and 13 coact to form a second transmission line that receives energy from a capacitor bank 14 through first transmission line means 15 defining multiple parallel paths.

The assembly thus described may be immersed in oil 16 carried by an external container 17 having a compartment 18 between the capacitor bank 14 and the wall of container 17 nearest the coil 11 for supporting a substance for exposure to the intense magnetic field developed when a heavy current flows through coil 11. A lid 21 may be securely bolted to container 17 to form a tight enclosure, and a vacuum pump 22 may extract virtually all the gas through opening 23 from the space between lid 21 and the oil 16. Leads 24 may be brought out through the wall of container 17 to a voltage charging source 25 for charging the capacitor bank in parallel.

Figure 2:
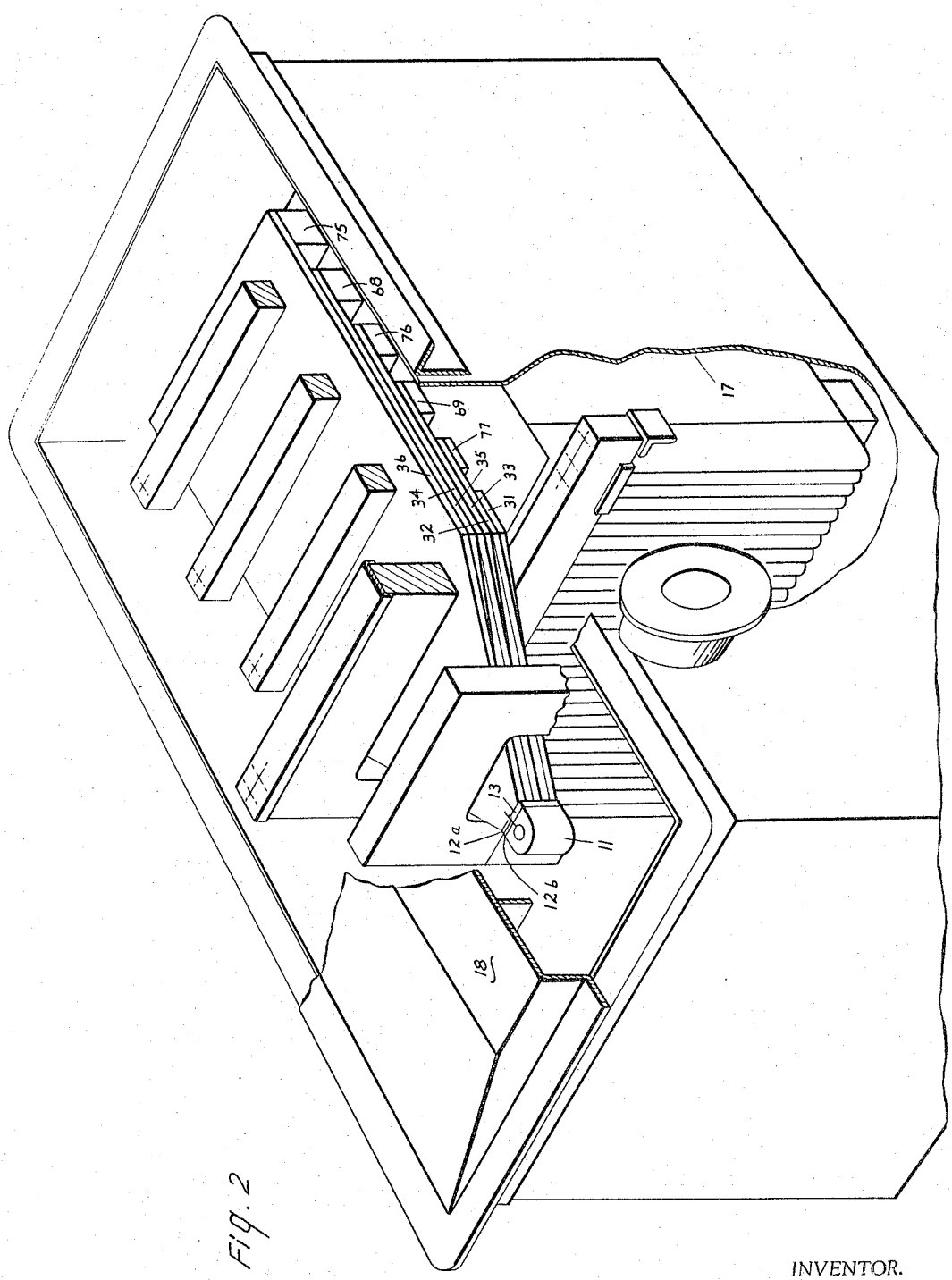
FIG. 2 is a perspective view of a preferred embodiment of the invention in which a bank of capacitors is coupled to a pair of output electrodes.

Referring to FIG. 2, there is shown a bank of capacitors situated in the container 17 coupled to the output electrodes 12 and 13 by the first transmission line means 15. The capacitor bank 14 may comprise a number of capacitors that it is desired to couple in parallel across output terminals 12 and 13 with each capacitor having three low, or normally grounded terminals and three high, or normally ungrounded, terminals. It is convenient to designate the potential on a grounded terminal by a minus sign and that on an ungrounded terminal by a plus sign. If the first output terminal 12 is designated as at ground or reference potential, it is convenient to designate that terminal as minus and the second terminal 13 as plus. Thus, capacitor bank 14 may have three low terminals coupled to low output electrode 12 by a group of first conducting strips 31, 33, and 35 and three high terminals coupled to the second output terminal 13 by a group of second conducting strips 32, 34 and 36, closely adjacent to but insulatedly separated from first conducting strips 31, 33 and 35 to comprise the first transmission line means 15.

The insulation between conducting sheets may be any of the well known types having suitable dielectric strength for the specific application. In an exemplary embodiment of the invention where the capacitors are charged to of the order of 50 kilovolts, polyethylene strips of the order of 50 mils thick insulatedly separate the first and second conducting strips. These strips preferably extend beyond the perimeter of the conducting strips, but this extension is not shown in the drawing so as not to obscure the arrangement of the different elements helpful in understanding the principles of the invention.

Each of the conducting strips defining the first transmission line means is formed with an end portion that tapers from the maximum width of the strips to a portion 37 closely adjacent to electrodes 12 and 13 where strips 31–36 are connected to terminating sections 41–46 respectively (FIG. 3), with first output electrode 13 being laid over the end faces of first terminating sections 41, 43 and 45 and second output electrode 12 being in contact with the end faces of terminating sections 42, 44 and 46 to define a second transmission line formed of opposed conductors of much smaller area than that of the opposed conducting strips 31–36 which define the first transmission line. The second transmission line supports a TEM wave having an electric field that is essentially horizontal and at right angles to the essentially vertical electric field of a TEM wave supported in the first transmission line means. The effect of the structure thus described is to carry a heavy current from the capacitor banks and concentrate this heavy current in the relatively small area between the opposed output electrodes 12 and 13 to provide an exceptionally heavy current per unit area across the gap between the output electrodes that produce an exceptionally large magnetic field. The transmission line nature of the structure is such as to support propagation of an electrical energy pulse of high energy and short duration so that the instantaneous magnetic field developed upon discharge of the capacitors is of unusually high peak intensity.

Referring more particularly to FIG. 3, there is shown a more detailed view of the output electrodes 12 and 13 and the terminating strips 41–46 terminating in fingers 51–56, respectively. Alternate ones of these fingers lie on opposite sides of the lengthwise centerline 57 of the first transmission line means and are preferably spaced as close to this centerline as practicable in view of the voltage across electrodes 12 and 13 to minimize the insulating area enclosed by conducting areas and, hence, the effective inductance. The end faces 42a, 44a and 46a engage electrode 12 and end faces 41a, 43a and 45a engage electrode 13.

The fingers 51–56 are preferably encapsulated in insulating material. For example, sheets of polyethylene may be placed between the fingers extending outside the perimeter of the fingers. The assembly of fingers and sheets may then be bonded together under heat and pressure to effect the encapsulation. The end faces 41a–46b may then be milled. The encapsulating innsulation is not shown in the drawing so as not to obscure details of the structural arrangement.

Output electrode 12 may be formed in two parts 12a and 12b which sandwich the cap 61 of thin L-shaped dielectric sheet 62 whose stem 63 may reside in a thin groove cut in the insulating material between the fingers. The faces 12c and 13c of output electrodes 12 and 13 may then contact coil 11. Dielectric sheet 62 is preferably formed so that it will break down when the voltage across output electrodes 12 and 13 reach a prescribed value, which may be of the order of 50 kilovolts for the specific system of FIG. 1. Dielectric sheet 62 may be made subject to breakdown by forming it with a small pinhole in cap 61 or by inserting a thin wire in cap 61, for example.

When the apparatus is employed in supplying an exceptionally high energy impulse, the fingers 51–56, output electrodes 12 and 13 and coil 11 may usually function for providing one high energy impulse. The interlocking arrangement best seen in FIG. 3 helps facilitate attachment of a new assembly following the occurrence of a high energy impulse.

Referring to FIG. 4, there is shown a preferred arrangement for establishing an exceptionally low inductance connection between each capacitor and the first transmission line means. Each capacitor comprises a winding of closely adjacent insulatedly separated conducting foils slightly displaced axially so that a convenient connection may be made at the bottom of the winding to one foil and at the top of the winding to the other foil. An inverted U-shaped insulator 64 may be arranged to fit over the winding formed with openings through which conducting tabs 65, 66 and 67 extend from the one foil and may be folded over as shown. Conducting bars 68 and 69 may then connect the tabs like 65 and 66, respectively, from all the capacitors to conducting strips 35 and 33, respectively while lowermost conducting strip 31 may directly contact the tabs like 67 of all the capacitors.

A wide conducting plate 71 may be arranged to contact the other foil at the bottom and be formed with three tabs 72, 73 and 74 which may be folded over as shown. Conducting bars 75, 76 and 77 may then connect the tabs, like 72, 73 and 74, respectively, from all the capacitors to conducting strips 36, 34 and 32, respectively. Such an arrangement provides an exceptionally low inductance path from the capacitors to the first transmission line means.

Most mechanical details of the means for securing the different elements together have not been shown in order to avoid obscuring the principles of the invention and because such means are well known in the art. For example, the capacitor foil tabs may be connected to the conducting bars by soldering and swedging techniques and the first transmission line means conducting strips may be clamped to the conducting bars. The first transmission line means may be assembled and clamped in the desired position shown. It may be desirable to plate certain contacting areas with silver to insure exceptionally high conductivity. The electrode portion 12a and electrode 13 may be bolted to the finger end faces. The coil 11 may be bolted to electrode 13 on one side and clamped on the other so as to maintain good contact with electrode face 12c of electrode portion 12b while keeping cap 61 of dielectric sheet 62 clamped tightly between electrode portions 12a and 12b.

By having the entire assembly immersed in an oil bath problems related to corona discharge and insulation breakdown associated with bringing high energy leads outside are greatly reduced.

It is evident that those skilled in the art may now make numerous modifications of and departures from the specific embodiment described herein without departing from the inventive concepts. Consequently, the invention is to be construed as limited solely by the spirit and scope of the appended claims.

What is claimed is:
1. Electrical apparatus comprising,
   capacitor means coupled between at least one first terminal and at least one second terminal,
   at least one first conducting strip coupled to said first terminal and at least one second conducting strip coupled to said second terminal,
   means for supporting said first and second conducting strips in closely adjacent insulatedly separated relationship to define at least one substantially parallel plate transmission line therebetween,
   first and second closely adjacent opposed insulatedly separated output electrodes each having a length corresponding substantially to the height defined by said at least one transmission line,
   each of said first and second conducting strips being formed with a tapered end portion having a broad end corresponding substantially to a width dimension of said conducting strips to a narrow end immediately adjacent to said first and second output electrodes and corresponding substantially to the thickness of said first and second output electrodes and coupling each first conducting strip to said first output electrode and each second conducting strip to said second output electrode to provide a low inductance path between said first and second terminals and said first and second output electrodes.

2. Electrical apparatus in accordance with claim 1 wherein there are a first plurality of said first terminals and a second plurality of said second terminals,
there are said first plurality of said first conducting strips coupling respective ones of said first terminals to said first output electrode,
and there are said second plurality of said second conducting strips coupling respective ones of said second terminals to said second output electrode.

3. Electrical apparatus in accordance with claim 2 wherein said tapered end portions comprise a plurality of narrow fingers with alternate ones of said fingers on opposite sides of but closely adjacent to the lengthwise centerline of said first and second conducting strips,
each of said end fingers having end faces in contact with one of said first and second output electrodes,
said first and second output electrodes being on opposite sides of said lengthwise centerlines and defining second transmission line means supporting propagation of a TEM wave having its electric vector orthogonal to the electric vector of a TEM wave whose propagation is supported in said at least one substantially parallel plate transmission line.

4. Electrical apparatus in accordance with claim 3 and further comprising,
means defining a conducting link,
and means for coupling said conducting link in series with said first and second output electrodes.

5. Electrical apparatus in accordance with claim 4 and further comprising,
means for selectively establishing conduction through said conducting link of electrical energy coupled from said capacitor means through means including said at least one transmission line and said first and second output electrodes.

6. Electrical apparatus in accordance with claim 5 wherein said means defining a conducting link conductively connects said first output electrode to said second output electrode.

7. Electrical apparatus in accordance with claim 6 wherein said means for selectively establishing conduction through said conducting link comprises dielectric means in the series path between said finger end faces adapted to break down when the potential across said first and second terminals exceeds a predetermined potential.

8. Electrical apparatus in accordance with claim 7 wherein said capacitor means comprises a capacitive unit which comprises,
a winding comprising slightly staggered first and second insulatedly separated conducting foils,
a first plurality of spaced conducting tabs extending from said first conducting foil at one end of said winding,
insulating means adjacent to at least one side of said winding and said one end and formed with openings each surrounding a respective one of said first plurality of spaced conducting tabs,
and a conducting plate formed with a second plurality of spaced conducting tabs at one end adjacent to said insulating means and separated by said insulating means from said one side conductively connected to said second foil at the other end of said winding.

9. Electrical apparatus in accordance with claim 8 wherein said capacitor means comprises a plurality of said capacitive units side-by-side,
and further comprising a first plurality of conducting bars conductively connecting respective corresponding ones of said first plurality of spaced conducting tabs of said side-by-side capacitive units to respective ones of said first conducting strips,
and a second plurality of conducting bars conductively connecting respective corresponding ones of said second plurality of spaced conducting tabs of said side-by-side capacitive units to respective ones of said second conducting strips.

10. Electrical apparatus in accordance with claim 9 and further comprising,
a vessel for enclosing said apparatus of claim 9 substantially fluid tight,
oil means covering said apparatus of claim 9,
means for evacuating the space in said vessel above the level of said oil means,
and means for charging said capacitor means.

11. Electrical apparatus in accordance with claim 10 and further comprising,
means within said vessel defining a platform below said means defining a conducting link.

12. Electrical apparatus in accordance with claim 1 wherein said capacitor means comprises a capacitive unit which comprises,
a winding comprising slightly staggered first and second insulatedly separated conducting foils,
a first plurality of spaced conducting tabs extending from said first conducting foil at one end of said winding,
insulating means adjacent to at least one side of said winding and said one end and formed with openings each surrounding a respective one of said first plurality of spaced conducting tabs,
and a conducting plate formed with a second plurality of spaced conducting tabs at said one end adjacent to said insulating means and separated by said insulting means from said one side conductively connected to said second foil at the other end of said winding.

13. Electrical apparatus in accordance with claim 2 wherein said capacitor means comprises a plurality of capacitive units side-by-side and each of said capacitive units comprises,
a conducting plate formed with a second plurality of spaced conducting tabs at said one end adjacent to said insulating means and separated by said insulating means from said one side conductively connected to said second foil at the other end of said winding,
a first plurality of conducting bars conductively connecting respective corresponding ones of said first plurality of spaced conducting tabs of said side-by-side capacitive units to respective ones of said first conducting strips,
and a second plurality of conducting bars conductively connecting respective corresponding ones of said second plurality of spaced conducting tabs of said side-by-side capacitive units to respective ones of said second conducting strips.

14. A capacitive unit comprising,
a winding comprising slightly staggered first and second insulatedly separated conducting foils,
a first plurality of spaced conducting tabs extending from said first conducting foil at one end of said winding,
insulating means adjacent to at least one side of said winding and said one end and formed with openings each surrounding a respective one of said first plurality of spaced conducting tabs,
and a conducting plate formed with a second plurality of spaced conducting tabs at said one end adjacent to said insulating means and separated by said insulating means from said one side conductively connected to said second foil at the other end of said winding.

15. Capacitor means in accordance with claim 14 comprising a plurality of said capacitive units side-by-side,
and further comprising a first plurality of conducting bars conductively interconnecting corresponding ones of said first plurality of spaced conducting tabs of said side-by-side capacitive units,
and a second plurality of conducting bars conductively interconnecting corresponding ones of said second plurality of spaced conducting tabs of said side-by-side capacitive units.

16. Apparatus for coupling a first group of capacitor terminals to a first output electrode and a second group of capacitor terminals to a second output electrode comprising,
said first output electrode,
said second output electrode,
said first group of capacitor terminals,
said second group of capacitor terminals,
coupling means including a plurality of stacked conducting plates defining a plurality of parallel transmission line paths supporting propagation of TEM waves having first electric vectors oriented in a first direction perpendicular to the planes of said conducting plates coupling said first and second groups to said first and second output electrodes,
said first and second output electrodes defining a two plate transmission line path supporting propagation of a TEM wave having a second electric vector oriented substantially perpendicular to the orientation of said first electric vectors,
and means defining a transition section for transforming TEM waves having first electric vectors oriented in said first direction propagating in said plurality of parallel transmission line paths into a TEM wave having a said second electric vector oriented substantially perpendicular to said first direction to develop a high potential between said first output electrode and said second output electrode.

References Cited by the Examiner
UNITED STATES PATENTS 2,676,309   4/1954   Armstrong.

LEWIS H. MYERS, *Primary Examiner.*

E. GOLDBERG, *Assistant Examiner.*